Patented June 27, 1950

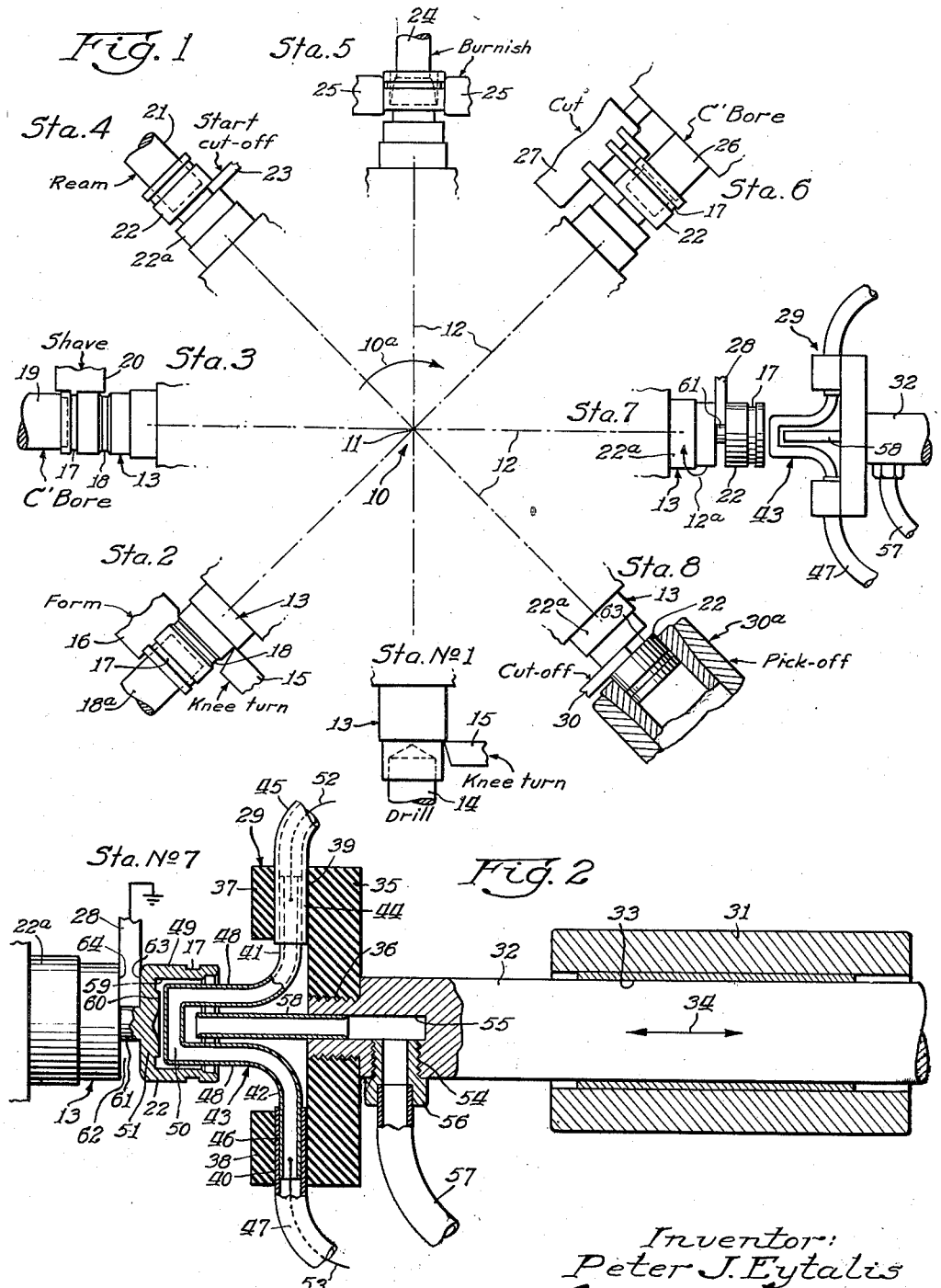

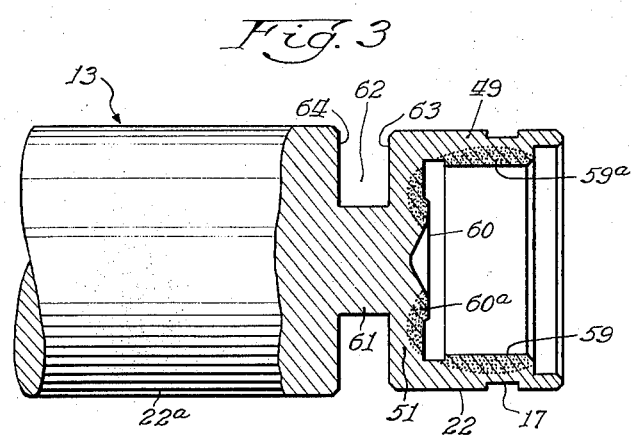
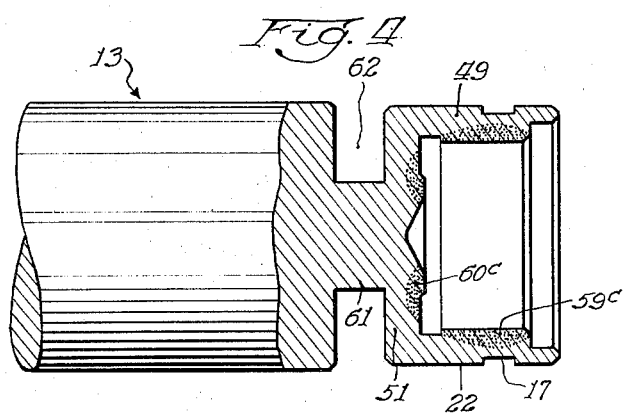
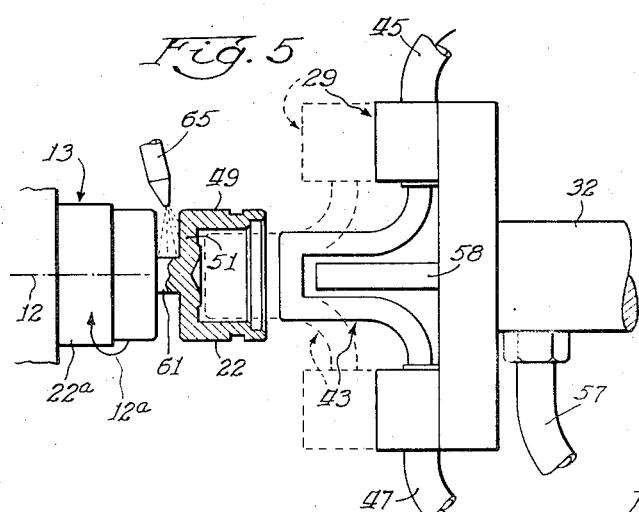

2,513,263

UNITED STATES PATENT OFFICE 2,513,263

COMBINATION MACHINE TOOL AND SURFACE-HARDENING APPARATUS AND METHOD

Peter J. Eytalis, Rockford, Ill., assignor to Borg-Warner Corporation, Chicago, Ill., a corporation of Illinois Application August 19, 1949, Serial No. 111,174

8 Claims. (Cl. 148—10.5)

This invention relates to an apparatus and method for surface-hardening articles.

This application is a continuation-in-part of my copending application, Serial No. 734,682, filed March 14, 1947, now abandoned.

An object of the invention is to provide an apparatus and method for machining metal articles to provide bearing members and the like, and surface-hardening the article.

A further object of the invention is to provide an apparatus and method for machining a metallic article to provide a bearing member and the like and simultaneously surface-hardening the member.

Still another object of the invention is to provide an apparatus and method for machining and surface-hardening a bearing member, or other member subject to frictional wear, wherein the member is rotated to perform a cutting operation thereon and is inductively heated while rotating to insure substantially uniform distribution of the induced heat to the surface or surfaces thereof to be hardened.

Another object of the invention is to provide an apparatus and method for simultaneously cutting and surface-hardening a bearing member, or other member subject to frictional wear, at a single station during a manufacturing operation thereof.

Another object of the invention is to provide an apparatus and method for machining and surface-hardening a metallic article wherein the surface-hardening equipment comprises high frequency induction apparatus for heat-treating a surface zone of the article to be hardened.

Another object of the invention is to provide a combination cutting and surface-hardening device which may be incorporated in an automatic screw machine having a plurality of stations to which bearing or other members are successively moved for different cutting operations thereon during the formative stages thereof and incorporating a surface-hardening apparatus located at one of said stations.

Another object of the invention is to provide an apparatus and method for surface-hardening metal articles, such as ferrous bearing members and the like.

Another object of the invention is to provide a method and apparatus for surface-hardening an article involving quickly heating a surface zone of the article and simultaneously heating a portion of the article sufficiently close to the surface zone of the article to modify the heating effect on the surface zone.

A further object of the invention is to provide an apparatus and method for surface-hardening metal articles, such as bearing members and the like, by utilizing a heating medium, which may be in the form of a high-frequency induction coil, to heat a surface zone of the article to a high temperature and simultaneously producing a lower temperature heat in a second surface zone of the article, by any suitable heat-producing means, for retarding the flow of the induced heat by conduction from the first zone toward the second zone, and thereafter applying a quenching medium to the inductively heated surface zone to effect hardening thereof.

A further object of the invention is to provide an apparatus and method for surface-hardening an article, in which a surface zone of the article is inductively heated and a cutting tool is simultaneously engaged with the article to cut a portion of the article spaced from the surface zone, the cutting tool engaging the article sufficiently close to the inductively heated surface zone to produce sufficient heat while cutting to modify the induction heating effect on the surface zone.

A still further object of the invention is to provide a method and apparatus for shaping an article and surface-hardening the article, in which a surface zone of the article is quickly heated by a heating medium, such as a high-frequency induction coil, and a cutting tool is simultaneously engaged with the article to shape a desired portion of the article spaced from the surface zone, the cutting tool engaging the article sufficiently close to the surface zone to produce heat, independently of the aforesaid heating medium, sufficient to substantially reduce and retard the flow of induced heat from the inductively-heated surface zone of the article to other relatively cooler portions of the article, and a quenching medium is applied to the inductively-heated surface zone to effect hardening thereof.

Another object of the invention is to provide a method and apparatus for satisfactorily hardening the inner side surface and the bottom surface of the cavity in a bearing cup; the satisfactory hardening of the bottom surface presenting much greater difficulties than the hardening of the side surface.

Another object of the invention is to provide an apparatus and method for hardening the inner surfaces of a bearing cup having an external groove for the reception of a snap ring whereby the depth of hardening in the side wall of the cup is controlled so that it does not extend through the side wall to the bottom of said groove.

Other objects and features of the invention will be apparent from the following description and accompanying drawings.

While in the accompanying drawings and description there is illustrated and described my invention as applied to certain specific purposes, it will be understood that my invention is not to be limited to the particular construction and use shown and described. From the disclosure herein, obviously, many modifications and other uses will readily suggest themselves to those skilled in the art.

Fig. 1 illustrates an automatic screw machine diagrammatically showing the various stages of work operations of the machine in successively machining metallic articles to provide finished bearing members and provided with apparatus for hardening surfaces of the bearing members;

Fig. 2 is a greatly enlarged sectional view of the machining and surface-hardening device illustrated at station 7 in Fig. 1;

Fig. 3 is a greatly enlarged view of an article similar to that shown in Fig. 2 and diagrammatically illustrating by stippling the depths of hardness of the side and bottom surface zones of the cavity in the bearing member portion of the article resulting from simultaneous cutting of the article and induction heating of the surface zones;

Fig. 4 is a greatly enlarged view of a sample article for comparison with that shown in Fig. 3, and illustrating by stippling the depth of hardness of the surface zones of the bearing cup portion of the article resulting when the cutting operation is performed prior to, and not simultaneous with, the induction heating; and Fig. 5 is a schematic view illustrating a modification of the apparatus.

Referring to the drawing, there is diagrammatically illustrated in Fig. 1 thereof an automatic screw machine, of the type illustrated and described in Patents Nos. 2,130,809 and 2,236,440, issued September 20, 1938, and March 25, 1941, respectively, to Carroll E. Miller, and comprising a turret generally designated 10 and pivoted at 11 to rotate in a direction as indicated by the arrow 10a and having radially extending arms or spindles 12, each of which rotates about their longitudinal axes as indicated by the arrow identified by the numeral 12a, the outer end of said arms having secured thereto cylindrical pieces 13 of steel bar stock, preferably of the well known stressproof, hot-rolled, C 1144 steel (A. S. M. Handbook of Metals), for successive cutting operations by machine tools to be described to provide bearing cups.

It may be noted that a plurality of stations 1 to 8, inclusive, of the machine are provided for successively shaping a piece 13 of bar stock by suitable tools from the initial work operation thereon at station 1 to finished bearing cup form at station 8. More particularly, the rotating workpiece 13 at station 1 is shown being provided with a cylindrical bore by means of a drill 14, while the cylindrical exterior thereof is having a knee-turning operation performed thereon by a cutting tool 15. At station 2, another knee-turning operation is performed on another exterior portion of workpiece 13 and simultaneously a forming tool 16 provides circumferential grooves 17 and 18 in the cylindrical exterior surface of the workpiece, and a counterboring tool 18a extends into the opening in the cylindrical bore of the workpiece 13 formed by the drill 14 at station 1. The groove 17 ultimately serves as a snap-ring groove to hold the bearing cup in place in a joint assembly, as is well known in the art.

At station 3, the workpiece is counterbored by a cutting tool 19 and the exterior and grooves 17 and 18 of the workpiece are subjected to a shaving operation by a tool 20 for insuring axial concentricity. At station 4, the workpiece 13 is reamed by the insertion of a suitable tool 21 performing this function in the bore of the workpiece, and the portion 22 of the workpiece, providing the bearing cup, is being cut off by a cutting tool 23 from the other workpiece portion 22a secured to the associated rotating arm 12. Station 5 illustrates burnishing operations on the inside and outside cylindrical surfaces of the workpiece by suitable tools 24 and 25 to bring the surfaces to the desired diameters and finish. Station 6 illustrates further depth cutting and counterboring operations by tools respectively designated 26 and 27. At station 7, a tool 28 further cuts and thereby reduces the diameter of the neck or connecting portion 61 between the bearing cup portion 22 of the workpiece and the turret-mounted workpiece portion 22a, while induction-heating to effect hardening of the interior surfaces of the bearing cup portion 22 by the apparatus, generally indicated at 29, takes place. The cutting tool 28 removes metal simultaneously with the induction heating and this cutting operation is performed without the application of a coolant to either the tool or the workpiece, so that the tool 28 causes independent heating of the workpiece, which is conducive to improved hardening of the inner surfaces of the bearing cup 22, as explained more fully hereinafter. Station 8 illustrates the severance of the bearing cup portion 22 from the turret-held portion 22a of the workpiece 13 by the cutting tool 30 and removal of the finished bearing cup 22 by the pick-off device 30a from the turret. It will be noted that, in each of the aforesaid cutting operations on the workpiece 13, the workpiece is rotated while the cutting tools are movable toward the workpiece for the cutting operation.

The present invention is directed primarily to the combined machine tool-cutting and surface-hardening operation conducted on the workpiece 13 at station 7 of the screw machine wherein, as before mentioned, the workpiece 13 is securely held by the rotating spindle 12 during a cutting operation on the workpiece by the tool 28 to continue the cut-off of the bearing cup portion 22 of the workpiece from the portion 22a of the workpiece, while interior surface zones of the cavity in the bearing cup portion 22 are hardened by the apparatus 29.

Referring now to Fig. 2, illustrating in enlarged and greater detail the means utilized at station 7 for performing the aforesaid cutting and hardening operations on the workpiece 13, said means comprises the surface-hardening apparatus 29 which is movable to and from the workpiece 13 and which functions to heat the interior surfaces of the bearing cup 22 by means of high-frequency induction currents and subsequently to project quenching fluid on the surfaces to harden the same during the cutting operation by the cutting tool 28. To this end, a stationary tubular member or support 31 is provided having a shaft 32 mounted in the bore 33 thereof for movement axially of the tubular member 31 toward and from the workpiece 13 as indicated by the arrow 34. A bracket 35 made of insulating material is fixed to the end of the shaft adjacent the workpiece 13 by a threaded connection 36 and is formed with top and bottom vertically aligned arms 37 and 38 extending laterally there-from toward the workpiece 13. The arms 37 and 38 are provided with aligned bores 39 and 40 receiving the opposite ends 41 and 42 of a hollow metal inductor coil generally indicated 43. One end 41 of the coil 43 is disposed within the end 44 of a flexible tube 45 of copper, or any other good electrical conductive material, in gripping engagement therewith, and the bore 39 of the bracket arm 37 and the other end 42 of the coil 43, in like manner, is received within one end 46 of a flexible tube 47 gripping the same and the bore 40 in the bracket arm 38, the inductor coil 43 thus being fixed to and between the bracket arms 37 and 38 in this manner and thereby being movable with the shaft 32 to and from the workpiece 13.

The inductor coil 43 is formed intermediate its vertically aligned ends to provide an angularly offset nose section which may be moved into and out of the bore of the bearing cup 22, said nose section comprising a pair of horizontal portions 48, 48, which as shown in Fig. 2 may be positioned adjacent the cylindrical lateral wall 49 of the bearing cup 22, the portions 48, 48 being connected to a vertical central portion 50 adjacent the flat end wall 51 of the cavity in the bearing cup, whereby these portions of the coil are positioned with respect to the inner surfaces of the walls of the bearing cup so that the coil is disposed in inductive heating relation to said surfaces. The ends 41 and 42 of the inductor coil 43 are connected to conductors 52 and 53, respectively, leading to a source of current (not shown) supplying alternating current of high frequency to the coil 43.

The inductor coil 43 is hollow and is adapted to have a cooling fluid conducted therethrough by means of the flexible tubes 45 and 47 connected to the opposite ends 41 and 42 of the coil 43 and providing respectively an inlet and outlet for the fluid passing through the coil 43 and cooling the electrode which otherwise would be inoperative for continuous service.

The cylindrical shaft 32 is provided with a radial passage 54 therein connected to an axial passage 55, and the passage 54 is provided with a hollow coupling 56 threaded into the shaft 32 and having a flexible tube 57 secured thereto. The passage 55 has a rigid, non-metallic, tube 58 fixed therein and extending outwardly axially of the shaft between the horizontal portions 48, 48, of the coil 43 and opening toward their connecting vertical portion 50 of the coil 43. The tube 57 provides an inlet for coolant quenching fluid which is allowed, after a predetermined period of heating of the bearing cup by the inductor coil, to flow through the hollow coupling member 56, the axial passage 55 of the shaft 32, and the tube 58 from which it is forcibly ejected onto the heated surface 59 of the wall 49 and the heated surface 60 of the wall 51 of the bearing cup, thereby causing hardening of these surfaces. It will also be apparent that the coolant fluid will also be effective to dissipate or reduce the heat in the bearing cup walls caused by the cutting operation.

In the operation of my improved combination machine tool and surface-hardening apparatus, when a workpiece 13 is moved to station 7 in Fig. 1 by the rotation of the turret about the pivot point 11, the cutting tool 28 which is electrically grounded through the screw machine will be moved toward the workpiece, rotated by the associated spindle 12, and proceed to cut into the connection 61 between the bearing cup portion 22 of the workpiece 13 and the turret-held portion 22a of the workpiece to reduce its diameter from about ⅝" to about 7/16". It may be noted that the cutting tool 28 is fed into the slot 62, the sides of which are defined by the exterior flat surface 63 of the bottom wall 51 of the cup portion 22 and the adjacent parallel surface 64 of the bar stock portion 22a, and the tool 28 has sufficient width to engage the sides 63 and 64 of the slot 62 to machine the surface 63 of the cup portion 22 to remove metal to obliterate marks left by the previous cutting tools 16, 23 and/or 27 and to insure the provision of a continuous flat exterior surface 63 during the cutting operation of the connection 61 by the tool 28, as will be apparent from an inspection of this surface 63 at station 8 in Fig. 1. During such cutting operation, the shaft 32 is moved axially toward the workpiece 13 to bring the nose section of the inductor coil 43 within the bore of the bearing cup portion 22, as shown in Fig. 2, and while the bearing cup portion 22 is being rotated by the spindle 12, the current is turned on for a period of time to effect heating of the walls 49 and 51 of the bearing cup by the inductor coil 43, the resultant heating of the inner surfaces 59 and 60 of these walls being accomplished by the action of the current established in these zones of the walls. After the lapse of a short heating period, wherein the temperatures of the surface zones 59 and 60 are raised to approximately 1650° F., coolant fluid, such as oil, is forcibly ejected from the tube 58, carried by the shaft 32, to effect quenching by the impingement of the quenching fluid on the surfaces 59 and 60 of the cylindrical side wall 49 and the bottom wall 51 of the bearing cup, respectively. It will be apparent that the inductor coil 43 is properly spaced from the surfaces 59 and 60 of the bearing cup to be hardened and that, by properly effecting a predetermined time duration of the application of the current to the electrode or inductor 43, it is possible to heat the desired surfaces to the critical temperature necessary to effect hardening by quenching.

An important feature of the invention is the enhanced heat-treatment of the walls 49 and 51 of the bearing cup 22 by the performance of the cutting operation simultaneously with the induction heating operation.

It has been particularly difficult heretofore to impart the desired depth of hardness and the degree of hardness, to wit, a depth of .040" to .060" and a Rockwell C 59–63 hardness to the bottom region of the cup cavity by induction hardening while at the same time controlling the zone of hardness in the side wall so that it does not exceed a desired depth. However, the desired hardness characteristics can be consistently attained by practising the principles of the invention as disclosed herein.

Figs. 3 and 4 diagrammatically illustrate on an enlarged scale typical test samples, wherein the sample of Fig. 3 had its connecting portion 61 reduced at station 7 from a diameter of about ⅝" to a diameter of about 7/16" while the heat hardening operation was being performed; and the sample of Fig. 4 had its connecting portion 61 similarly dimensionally reduced to the same diameter, but prior to any induction heating and hardening thereof. Such samples prove that a greater depth and greater degree of hardness was obtained in the hardened zone indicated by the stippled area and numeral 60a, Fig. 3, during simultaneous heating and hardening, than was obtained when the induction heating was performed without cutting, or without otherwise independently heating the workpiece 13 in the region of the connection 61. Fig. 4 is illustrative of the results obtained under the latter conditions and under which the hardened zone 60c is of less depth than the zone 60a. Actually, the test samples showed that the hardened zone 60a of samples corresponding to Fig. 3 had the requisite depth and a surface hardness of Rockwell C 61; whereas, the zone 60c of samples corresponding to Fig. 4 had a maximum depth of hardness of .030" to .035" and a surface hardness of less than 59 Rockwell C, or less than the acceptable minimums. Also, the radial extent of the hardened zone 60a is greater than that of the zone 60c, it being especially noteworthy that the zone 60a extends to a point just short of the corner at the bottom of the cavity in the bearing cup 22, which if heat treated would constitute a serious fatigue or stress point likely to result in failure of the bearing cup.

It is less difficult to obtain the desired depth of hardness and degree of hardness in the stippled zones of the side walls of the bearing cups because such walls surround the induction coil during the induction heating cycle; whereas, the bottom walls of the cups merely confront the end 50 of the induction coil. This effect is well recognized in the induction heating art.

Upon the attainment of the desired hardness characteristics in the bottom zone 60a, the side zone 59a will also be found to have acquired the requisite hardness characteristics without the depth of hardness penetrating to the bottom of the snap ring groove 17. However, prolonged induction heating of a specimen corresponding to Fig. 4 to increase the depth of the hardened bottom zone 60c to correspond to the depth of the zone 60a of Fig. 3, will be found to have caused the depth of hardness of the side zone 59c to have reached to the snap ring groove 17. This is highly undesirable because such hardening causes the metal at the groove 17 to lose its ductility with the result that the bearing cup is likely to either break in two at said groove during assembly in a universal joint, or break in use.

One possible theory of explanation for the highly advantageous results represented by the bearing cup shown in Figs. 2 and 3 over that of the bearing cup shown in Fig. 4 is that the high frequency currents induced in the work-piece creates heat which penetrates into the walls 49 and 51 at the surfaces 59 and 60 to a depth of about twenty thousandths of an inch. This induced heat has a tendency to flow rapidly away from the surface zones of the article by conduction to the cooler portions of the walls 49 and 51 and, in case of the bottom surface zone 60a or 60c, also to flow through the connection 61 to the bar stock 22a inasmuch as, in accordance with well-known principles of physics, heat will tend to be rapidly conducted from a heated portion of a metallic article to a relatively cooler region thereof. It is critical that the induced heat in the walls 49 and 51 be confined as much as possible in order that the inner portions of the walls be properly heated to obtain zones having the desired depth of hardness and surfaces having the desired degree of hardness and, of course, it will be apparent that, if this heat is permitted to be rapidly conducted away from the inductively heated portions of the walls 49 and 51, through the connection 61 to the bar stock 22a, the desired depth of hardness and degree of hardness in the walls 49 and 51 cannot be attained, with the result that unsatisfactory hardening is had. In the present case, the heat produced by the cutting tool engagement with the connection 61, to further sever the bearing cup 22 from the bar stock 22a, is primarily instrumental in substantially retarding the flow of the induced heat by conduction from the walls 49 and 51, through the connection 61 to the bar stock 22a, although it is possible that the relatively small amount of heat produced by the relatively light cut along the exterior side 63 of the bottom wall 51, to remove metal to obliterate marks left by other tools, may also have some slight beneficial effect in retarding heat flow. The heat generated by the cutting tool 28 in the wall 51 and connection 61 is effective to provide heated zones between the inductively heated portions of the walls 49 and 51 and the cold mass represented by the bar stock 22a, the tool-heated zones acting to retard the flow of heat by conduction away from the inductively heated walls of the bearing cup portion 22 inasmuch as the temperature differential between the walls 49—51 and the connection 61 is less than that between said walls and the bar stock 22a.

It will be clearly apparent from Figs. 3 and 4, which are representations of actual test samples, that the heating of the bearing cup by the cutting tool 28 inherently modifies the heat distribution or heat pattern in the walls 49 and 51 as illustrated in Fig. 3, as compared with the heat distribution produced by induction heating after cutting, as represented by Fig. 4, the difference being attributable to the fact that the heat caused by the cutting operation acts as a dam to prevent excessive conduction of the induced heat away from the walls 49 and 51 to the connection 61 and bar stock 22a, thereby producing a substantially more uniform heat distribution and a greater depth and area of surface hardness of the zones 59a and 60a. These representations of test samples in Figs. 3 and 4 clearly show the benefits attained by a simultaneous cutting and heating operation.

In practising the invention, I employ a high-frequency apparatus (portions of which are not shown but are well known in the art) capable of generating 20 kilowatts at 450,000 cycles, the generating apparatus being placed approximately 13 feet from the work being heat-treated and being connected by means of a so-called co-axial cable from the oscillator of the apparatus to an R. F. current transformer of the apparatus adjacent the screw machine, and which transformer, it will be understood, is connected to the inductor coil 43 of the apparatus 29. This coil 43 is aligned with the axis of rotation of the workpiece 13 and enters the bearing cup portion 22 until it is about .020 of an inch from the surface 60 of the bearing cup wall 51, and is spaced about .050 to .060 of an inch from the cylindrical surface 59 of said bearing cup. The reason for the close coupling (.020 of an inch) between the end 50 of the inductor coil 43, and the surface 60 is to concentrate the greatest induction heating effect possible in the wall 51, the heating efficiency at the wall 51 being approximately ⅓ as efficient as the heating efficiency at the wall 49. Consequently, it is necessary to couple the end 50 of the inductor coil 43 to wall 51 approximately ⅔ closer than the coupling with the wall 49 in order to approximate the same degree of heating efficiency.

If the induction heating should be performed after, and not simultaneously with, the cutting operation, it is very difficult to acquire the desired hardness characteristics in the walls 49 and 51, as previously explained. However, when the cutting and induction heating operations are done simultaneously, the tool 28 starts cutting approximately 5 to 6 seconds before the inductor coil 43 starts inducing heat in the bearing cup walls, the induction heating being continuous for 1.3 seconds, and the cutting continuing during the induction heating and thereafter for approximately 5 to 6 seconds. The cutting tool 28 will generate heat to a temperatuure of at least 500° F., or more, depending upon the sharpness of the cutting tool 28 (this temperature was determined by carefully comparing the color of the chips produced by the cutting tool with the color of samples of the same steel that had been progressively heated in a small electric specimen furnace to increasing temperatures until the color matched that of the chips, this procedure being the only practical way of determining this temperature). This 500° F. temperature has the effect of retarding the inherent tendency of the relatively cold mass to draw the induced heat away from the walls 49 and 51 towards the bar stock 22a through the connection 61 and allows the temperature in said walls to quickly rise to approximately 1650° F. thereby providing the proper critical temperature for attaining a surface hardness of Rockwell C 59–63. In fact, the induction heating produces a temperature of about 900° F. in the side wall 49 at the bottom wall of the snap ring groove 17, which is at the thinnest inductively heated section of the bearing cup 22, to cause said bottom wall to glow with a dull cherry red color.

The substantial confinement of the induced heat in the walls 49 and 51 by the substantial prevention of loss or transfer of the induced heat by conduction, is a decisive factor in obtaining the desired surface area and depth of hardness and the required degree of hardness. All of these characteristics are important and are essential in order to withstand frictional wear and loads of high unit pressure. Both the degree and depth of hardness depend upon the retention of the induced heat in the surface zones.

After quenching of the walls of the bearing cup 22, to complete the hardening operation, the shaft 32 is actuated to withdraw the inductor coil 43 from the bearing cup, whereupon the workpiece 13 is rotated by the turret 10 to station 8 of the screw machine for the final cut-off operation by the tool 30.

It will be readily apparent that, due to the rotation of the workpiece 13 during the hardening of the interior surfaces of the bearing cup portion 22 thereof, a fairly uniform radial depth of hardness is produced by the even penetration of the heat into the walls 49 and 51 of the bearing cup and subsequent quenching of the interior of the bearing cup.

While I have shown a cutting too as being instrumental in generating heat to substantially retard the flow of the electrically induced heat in the walls 49 and 51 of the bearing cup, it will be readily apparent from Fig. 5 that the application of a gas flame by a nozzle 65 or other heat-generating medium applied to the bottom wall 51 and/or the connection 61 will act, similarly to the cutting tool generating heat, to produce a heated zone intermediate the inductively heated bearing cup 22 and the cold bar stock 22a to substantially retard the flow of the induced heat from the inductively heated portions of the walls 49 and 51 of the bearing cup to the otherwise relatively cooler portions of said walls, and the connection 61 and bar stock 22a; and it is, therefore, within the contemplation of my invention that the aforesaid method and apparatus is not to be limited to the generation of heat by a cutting tool, but is to be given sufficient scope to also include any instrumentality capable of producing heat in one zone of an article to substantially retard or modify the conduction of heat produced in another portion of the article on one side of said zone to a relatively cold portion on the other side of said zone, or to any arrangement for preventing the flow of induced heat from a surface zone of a metallic article of manufacture to a cooler mass engaged therewith.

It will be understood that other apparatus and modes of applying the principles of my invention may be employed instead of that explained, and that changes may be made as regards the product and the apparatus and steps herein disclosed, so long as they fall within the scope of the following claims.

I claim:

1. A method of making an article from a workpiece, which comprises the steps of: quickly heating a zone of a workpiece, while cutting a portion of said workpiece spaced from said quick-heated zone to advance the article toward completion, the cutting of said workpiece portion being performed sufficiently close to said quick-heated zone to produce cutting-heat to modify the effect of said quick-heating on said zone; and applying a quenching medium to said quick-heated zone to harden the same.

2. A method of making an article from a workpiece, which comprises the steps of: inductively heating a zone of the workpiece, while engaging a cutting tool with a portion of said workpiece close to but spaced from said zone to advance said workpiece toward completion and also to produce cutting-heat in said workpiece of relatively low temperature, compared with the temperature of the induced heat, to retard the flow of the induced heat from said zone to relatively cooler portions of said workpiece, said cutting being performed sufficiently close to said zone for the cutting-heat to modify the effect of the induced heat on said zone; and applying a quenching medium to said inductively heated zone to harden the same.

3. A method of making an article from a workpiece having a hardenable surface zone, which comprises the steps of: first cutting a portion of the workpiece at a region spaced from said zone, to advance the article toward completion, and to provide cutting-heat for conduction through the workpiece toward said zone; then heating said zone to a higher temperature than said cutting-heat, said cutting being performed sufficiently close to said zone for the cutting-heat to modify the effect of the higher heat on said zone; and then applying a quenching medium to said heated zone to effect hardening thereof.

4. A method of making an article from a workpiece, which comprises the steps of: rotating said workpiece relative to a cutting tool and engaging said cutting tool and said workpiece to effect cutting of a portion of said workpiece to advance the article toward completion; inductively heating a zone of said workpiece spaced from the portion of said workpiece being cut, with said cutting tool engaging said workpiece portion sufficiently close to said zone to produce cutting-heat to modify the induction heating effect on said zone; and applying a quenching medium to the inductively heated zone to harden the same.

5. A method of surface-hardening a hardenable article attached to a workpiece by a neck portion, which comprises the steps of: first cutting said neck portion to produce cutting-heat in the region of the neck portion of said workpiece for flow toward a surface zone of the article; then inductively heating said surface zone of said article while continuing to cut said workpiece at said neck portion, said neck portion being sufficiently close to said surface zone so that the heat produced at said neck portion retards the flow of the induced heat from said article to the unheated portion of said workpiece; and applying a quenching medium to the inductively heated surface zone to effect hardening thereof.

6. A method of making an article from a workpiece having a cavity formed in one end thereof and a groove formed in the outer surface thereon in a region spaced inwardly from said one end of said workpiece and beyond but adjacent to the bottom of said cavity, which comprises the steps of: rotating the workpiece and engaging a cutting tool with said workpiece at said groove to further cut said workpiece to advance it toward completion and to produce cutting-heat in said workpiece for flow toward the walls of said cavity; inductively heating the surfaces of said cavity while said workpiece is being rotated, whereby said cutting-heat modifies the induction heating effect on said cavity walls; and applying a quenching medium to the heated surfaces of said cavity to effect hardening thereof.

7. A method of making and hardening a workpiece having a cavity formed in one end thereof and a groove formed in the outer surface thereon in a region spaced inwardly from said one end of said workpiece and beyond but adjacent to the bottom of said cavity, which comprises the steps of: engaging a cutting tool with said workpiece at said groove and rotating said workpiece to further cut said workpiece to advance it toward completion and at the same time to produce cutting-heat in said workpiece; then inductively heating the walls of said cavity to effect induction heating of said workpiece simultaneously with the cutting of said workpiece by said cutting tool, whereby the heat produced by said cutting tool will substantially prevent the transfer of the induced heat from the cavity walls to relatively cooler portions of said workpiece and thus modify the effect of the induction heating on said cavity walls; and then applying a quenching medium to the heated walls of said cavity to effect hardening of said cavity walls.

8. Apparatus for machining a workpiece to provide a cup-like article and for surface-hardening portions of said article, comprising: means for rotatably supporting a workpiece having a cavity formed in one end thereof including a side wall having an inner cylindrical surface, and a bottom having a substantially flat inner surface; a cutting tool adapted to engage the workpiece to cut the same in a region spaced from said one end of said workpiece and beyond but adjacent to the bottom of said cavity to partially sever the article from said workpiece; induction heating means insertable into said cavity in axial alignment with the axis of rotation of said workpiece for simultaneously heating the side and bottom surfaces of said cavity; means for inserting said induction heating means into said cavity and for supporting the same in axial alignment with the axis of rotation of said workpiece; means for rotating the workpiece relative to said cutting tool and induction heating means, respectively, to effect cutting of the workpiece by said cutting tool during induction heating of said workpiece, said cutting tool producing heat in said workpiece to modify the effect of said induction heating on said workpiece; and means for applying a quenching medium to the heated side and bottom surfaces of said cavity to effect hardening thereof.

PETER J. EYTALIS.

REFERENCES CITED

The following references are of record in the file of this patent:

UNITED STATES PATENTS

| Number | Name | Date |
| --- | --- | --- |
| 1,383,963 | Mordey | July 5, 1921 |
| 2,070,889 | Frickey et al. | Feb. 16, 1937 |
| 2,182,799 | Farr | Dec. 12, 1939 |
| 2,202,758 | Denneen et al. | May 28, 1940 |
| 2,412,797 | Berliner | Dec. 17, 1946 |
| 2,444,259 | Jordan | June 29, 1948 |
| 2,457,179 | Romay | Dec. 28, 1948 |
| 2,477,411 | King | July 26, 1949 |

FOREIGN PATENTS

| Number | Country | Date |
| --- | --- | --- |
| 134,599 | Great Britain | Nov. 3, 1919 |

OTHER REFERENCES

Metal Progress, July 1943, pages 78–83.